United States Patent Office 3,437,590
Patented Apr. 8, 1969

3,437,590
SINGLE-RING NAPHTHENE REMOVAL
William J. Asher, Cranford, N.J., assignor to Esso Research and Engineering Company, a corporation of Delaware
No Drawing. Filed July 10, 1967, Ser. No. 651,987
Int. Cl. C10g 25/00; C07c 7/00
U.S. Cl. 208—310        10 Claims

ABSTRACT OF THE DISCLOSURE

This invention relates to the separation of hydrocarbon mixtures and in particular to the separation of one-ring naphthenes from one-naphthenic hydrocarbons. More specifically, the invention relates to the separation of one-ring naphthenic hydrocarbons from the other non-naphthenic constituents of a jet fuel. This separation is accomplished by selective adsorption of the one-ring naphthenes on a lithium-type molecular sieve having pore openings between 6.5 and 15 angstroms.

DESCRIPTION OF THE PRIOR ART

The prior art relating to molecular sieves is quite extensive in nature. The sieves, or zeolites, have crystal structures containing large numbers of small cavities interconnected by a number of still smaller holes or pores, the latter being of exceptionally uniform size. Only molecules small enough to enter the pores can be adsorbed, though all molecules even though small enough to enter the pores will not be adsorbed. An affinity of the molecule for the adsorbent must be present. In order to separate normal paraffins from mixtures including at least one cyclic, aromatic or isocompound, a molecular sieve having an effective pore diameter of 3 to 6 angstrom units is required. Molecular sieves which have larger pore openings such as from 8 to 15 angstrom units may be utilized to separate aromatic compounds from mixtures in which they are contained.

In U.S. Patent No. 2,882,244, it is disclosed that a single ring naphthene, methylcyclohexane, may be adsorbed into a lithium-exchanged type X molecular sieve. This particular sieve has pore openings of about 10 angstroms. It should be noted that the lithium X sieve was not considered to be the best exchanged sieve for adsorbing the methylcyclohexane and that better results were achieved with a manganese type X sieve. Further, this was merely the adsorption of a one-ring cycloparaffin; there was no teaching relevant to the adsorption of this one-ring naphthene preferentially from hydrocarbon mixtures. These mixtures would include higher molecular weight hydrocarbons and aromatics which have a stronger selective attraction to the molecular sieve than does a one-ring-naphthenic hydrocarbon.

U.S. Patent No. 3,182,017 to Union Oil teaches the use of a type X molecular sieve for the separation of a mixture containing naphthenic and aromatic hydrocarbons. In this patent, the teaching relates to the fact that aromatics are more preferentially adsorbed on a type X seve than naphthenes.

In U.S. Patent No. 3,242,070 there is a broad teaching to the removal of naphthanese by means of a molecular sieve. However, only a very slight removal of the one-ring napthenes is effected with the large port sieve utilized in that invention. By far the greatest success achieved is in the removal of two and three-ring naphthenes.

The removal or concentration of these one-ring naphthenes has been a particularly troublesome problem especially in the areas of jet fuel production and aromatic production. In aromatic production by catalytic reforming a feed with a higher concentration of single ring naphthenes has greatly enhanced value because the six carbon atom ring convert easily with high efficiency.

In the past, these naphthenes have been removed by hydroforming and conversion to the corresponding aromatics which may then be removed by conventional methods. However, this is extremely expensive and time consuming.

With the rising importance of Mach II and Mach III airplanes in both military and commercial fields, the need for high grade jet fuels has increased astronomically; the projected requirements in this area indicate that the need will continue to multiply. Naphthenes have a low B.t.u. value and also depress the luminometer number of jet fuels. Luminometer number is a dimensionless term which is used as a measure of flame temperature at a fixed flame radiation in the green-yellow band of the visible spectrum. The luminometer number of a fuel can be correlated with the combustion characteristics of the fuel for use in jet engines and the like. It is determined by a technique described in ASTM D–1740. As the luminometer number of a fuel increases, its prefromance characteristics increase proportionately. The luminometer number of a jet fuel is important and must be carefully guarded.

In the production of lube oils, the viscosity index (V.I.) is an important quality parameter. It measures the degree of change of viscosity with temperature. The higher the quality of the oil, the higher the V.I. and the less than viscosity changes with temperature. Naphthenes reduce the V.I. of oils. In view of this multiplicity of function, a method is needed for the separation of one-ring naphthenes from other hydrocarbons and particularly the separation of one-ring naphthenes from mixtures which include aromatics. Although this may be accomplished by known methods, none of those available methods are economical and they also induce undesirable side reactions.

SUMMARY OF THE INVENTION

According to this invention, it has unexpectedly been discovered that a molecular sieve having pore openings of 6.5 to 15 Angstroms, preferably 8 to 11 Angstroms, in the lithium exchanged form may be utilized to remove one-ring naphthenic hydrocarbons from hydrocarbon mixtures. More particularly, these hydrocarbon mixtures will contain at least one constituent selected from the group consisting of aromatics, normal paraffins, isoparaffins and multiple-ring naphthenes. Briefly, the lithium sieve is made by a variety of techniques; it is preferred to exchange the $Na^+$ form of the sieve twice with a 2 N solution of $Li^+$ salts. Other substituted sieves containing 6.5 to 15 Angstroms are not nearly so selective for one-ring napthenes which are in admixture with the above-mentioned constituents. When utilizing a sieve such as $Ca^{+2}X$ or $Mg^{+2}X$, the ratios of single-ring to total paraffins in the effluent was only about .82 to .88 of that of the feed. On contact, $Li^+X$ sieve gave comparable ratios of .75 to .80. The one-ring naphthenes will be adsorbed from admixtures with aromatics or other materials which have a high affinity for sieves of this type.

The selectivity in the presence of the strongly held aromatics is accomplished by limiting the amount of aromatics passed over the bed each cycle. The amount of aromatics is limited to below .1 w./w. per cycle, preferably below .015 w./w. per cycle.

Particular feedstreams from which one-ring naphthenes may be separated include jet fuels, kerosene, naphthas and lube stocks. The lithium exchange sive may have pore openings of 6.5 to 15 Angstroms, preferably 8 to 11 Angstroms and in the most preferred case would be the X type sieve. The sieve is made by the following procedure.

The sodium form of X or Y type molecular sieve was the starting material for the ion exchanged sieves. The exchanges were conducted by contacting the sieve with solutions containing the Li cation to be exchanged with the sieve at room temperature. The sieves were contacted with 2.15 liters of solution for each gm. mole of sodium initially on the sieve. Two normal solutions were used. To increase the extent of ion exchange multiple exchanges were used; two exchanges were standard. In the final exchange the sieve was allowed to contact the solution for 16 hours. Contacting in the previous exchanges was limited to 2 hours with stirring. After the initial exchanges the sieve was washed with 2.15 liters of demineralized distilled water per gm. mole of sodium initially on the sieve. After the final exchange the sieve was washed with 4.3 liters of demineralized distilled water per mole of initial sodium.

The water adsorbed on the sieve from the washing was removed by heating with a nitrogen purge going through a bed containing the sieve. A nitrogen purge of 750 volumes at STP per volume of sieve per hour was used. The temperature was increased slowly at a steady rate of 100° F. per hour from ambient temperature to 950° F. The temperature was maintained at the final 950° F. for 16 hours with continued nitrogen flow to thoroughly dry the sieve.

Although any desorption technique can be used with this invention, the use of a displacing agent is preferred for operation. Under conditions using a displacing agent the advantages of using an Li+ exchanged sieve become more pronounced. When using ammonia as a displacing agent with a $Ca^{+2}$ form of X type sieve, no separation was achieved; the ratio of single-ring naphthenes to paraffins in the effluent was the same as that of the feed. However, when using an Li+ form of X type sieve with ammonia for a displacing agent, stable cyclic operation was obtained with the ratio single-ring naphthenes to paraffins in the outlet of 0.88 that of the feed and 0.715 that of the material desorbed with ammonia.

DETAILED DESCRIPTION OF THE INVENTION

In more detail, this invention concerns the unexpected finding that a high selectivity to one-ring naphthenes is demonstrated by a lithium sieve having pore openings of 9 to 11 Angstroms which are X and Y type sieves. By high selectivity, it is meant that the effluent has ratios of single-ring naphthenes to total paraffins of about .75 to .80 of that of the feedstock. This selectivity with four stages of separation would correspond to a reduction in the ratio of .33 to .40 of that of the feed. The feedstock must contain at least one constituent selected from the group consisting of normal hydrocarbons, aromatics, isoparaffins, multiple-ring naphthenes, and hydrocarbons which are substituted with at least one polar group. The amount of aromatics passed over the molecular sieve bed each cycle is limited to below .1 w./w. per cycle and preferably below .015 w./w. per cycle. The amount of other very strongly held components passed over the bed each cycle should also be limited. Their strongly held components would be hydrocarbon compounds substituted with polar groups such as sulfur, nitrogen, alcohols, halides, ketones and nitrates. The amounts of these compounds passed over the bed each cycle should be limited to less than 0.1 w./w. and preferably less than 0.015 w./w. Several different one-ring naphthenes may be selectively adsorbed onto the lithium exchange large pore sieve of the instant invention; they include cyclohexane, methylcyclohexane, 1,2-dimethylcyclohexane, ethyl cyclohexane, and cyclopentane. It should be emphasized that the essence of this invention is the selective adsorption from particular mixtures of one-ring naphthenes onto the various lithium exchanged sieves which are designated. The mere ability of lithium exchanged sieves of this nature to adsorb one-ring naphthenes is not considered to be novel.

Following the adsorption of the one-ring naphthene onto the lithium exchanged large pore sieve, removal of the adsorbed naphthene will have to be effected. A variety of methods may be utilized to accomplish this result. They include lowering the pressure, raising temperature, purging with an inert gas, displacing with an adsorbable material or any combination of these methods.

The preferred method of desorption is with a displacing agent. A displacing agent is defined as a polar or polarizable material having an appreciable affinity for the zeolitic adsorbent compared with the material to be desorbed. Displacing agents are also referred to as desorbents and displacing mediums. Suitable displacing agents for the process of this invention include $SO_2$, ammonia, carbon dioxide, $C_1$–$C_5$ alcohols such as methanol and propanol, glycols, such as ethylene glycol and propylene glycol, halogenated compounds such as methyl chloride, ethyl chloride, nitrated compounds, such as nitromethane and the like. Preferably, the displacing agent will be used in the gaseous state although on occasion liquid state could be utilized. The most preferred displacing agent has the general formula:

wherein $R_1$, $R_2$ and $R_3$ are selected from the group consisting of hydrogen and $C_1$–$C_5$ alkyl radicals. Thus, the desorbing material includes ammonia, primary, secondary and tertiary amines.

When using the preferred desorption technique, displacement with a polar material, the advantage of lithium exchanged sieve becomes more striking.

Several cation forms of sieve showed some selectivity although substantially reduced from that of lithium for single-ring naphthenes when tested on fresh sieve in the absence of a displacing agent. However, when a superior cation form, calcium X, was tested in the presence of the preferred $NH_3$ displacing agent simulating the condition of the sieve after an ammonia displacement, a very sharp decrease in adsorption ability was apparent. In contrast, when operating with lithium X sieves, selectivity to single-ring naphthenes was maintained in the presence of ammonia and actual cyclic operation using ammonia desorption.

The feedstream may be introduced into the sieve separation zone, containing the lithium exchanged large pore sieve, in either the vapor or liquid state although vapor is preferred. During adsorption, the zone is maintained at a temperature of 300° to 800° F., preferably 500° to 700° F. and at a pressure of 1 to 75 p.s.i.a. The amount of feed put over the bed is between .06 and 2.0 w./w., preferably between .08 and .50 and most preferably between .10 and .30. This is normally done between 2 and 20 minutes. The desorption cycle removes at least .2 and preferably greater than .8 of the material adsorbed in the previous step. This is normally done between 2 and 20 minutes. Temperature is generally maintained between 500° and 700° F. and pressure of 1 to 75 p.s.i.a. may be utilized. These ranges are applicable for operations with a displacing agent, an inert purge, or desorption with a lighter or heavier normal paraffin. Needless to say, they have to be varied if one wishes to desorb with high temperature, such as temperatures of 600° to 900° F. or with vacuum where pressure may be reduced quickly or in several stages to a level of 0.1 to 5.0 p.s.i.a.

In a preferred embodiment of the instant invention, a lithium exchanged sieve of the X type is utilized. A feedstream boiling in the kerosene range of 150° to 450° F. which typically comprises the following constituents: single-ring naphthenes, multiple-ring naphthenes, normal plus isoparaffins and aromatics are passed over the lithium exchanged sieve. The temperature of the sieve was about 500° to 700° F., the pressure was 15 to 45 p.s.i.a. and 0.08 to .16 w./w. of the feedstream is passed over the bed. At the end of about 2 to 10 minutes, the adsorption period is stopped. An effluent is recovered from the bed which comprises the following: 28% single-ring naphthenes, 3% multiple-ring naphthenes, 68% normal plus isoparaffins and 1% aromatics. This, of course, shows the expected depletion of multiple-ring naphthenes and aromatics. In addition, this sievate has a ratio of single-ring naphthenes to total paraffins of 0.420 compared to 0.477 in the feed. This shows selectivity for the single-ring naphthenes. The bed was then desorbed with a displacing agent which in this case was ammonia. The temperature during desorption was 500° to 700° F. and the pressure was 15 to 45 p.s.i.a. About .08 to .6 w./w. of ammonia was passed over the bed. At the end of about 2 to 10 minutes, the desorption is complete and substantially all of the adsorbed material has been removed from the lithium exchanged sieve. Analysis of the desorbate indicated the following: 28% single-ring naphthenes, 12% multiple-ring naphthenes, 47% normal plus isoparaffins and 13% aromatics. This desorbate had a ratio of single-ring naphthenes to total paraffins of 0.59 compared to 0.477 in the feed. Comparing the ratios of single-ring naphthenes in the sievate 0.42 with that of the desorbate 0.59 the overall separation factor was .715 depletion, a 1.4 concentration of single-ring naphthenes in one stage.

Example 1

A specific series of examples was run to compare various exchanged sieves with the lithium sieve with respect to their ability to preferentially adsorb one-ring naphthenes which is in the presence of other adsorbable materials. The lithium sieve, which was a lithium type X sieve, having angstrom openings of about 10 was utilized. Other sieves tested included LiY, CaX, MgX, MgY, MnX, SrX and SrY.

Conditions for all runs were identical; they were as follows: Fresh samples of sieve were dehydrated at 950° F. with nitrogen flow and then cooled to 700° F. A jet fuel feed boiling between 150° and 450° F. with the composition given in Table I was used.

TABLE I.—ANALYSIS OF FEED

Type of Feed: Military jet fuel
Additives: Anti-icing additive and corrosion inhibitor
Source: Humble Oil and Refining Company, Baton Rouge, La., refinery
Gravity, API: 53.6°

Mass spectra analysis: Wt. percent
Benzene _____ 0.74
Toluene _____ 0.76
$C_8$ aromatics _____ 1.64
$C_9$ aromatics _____ 2.75
$C_{10}$ aromatics _____ 1.70
$C_{11}$ aromatics _____ 1.00
$C_{12}$ aromatics _____ 0.45
$C_{13}$ aromatics _____ 0.21
Naphthalenes _____ 0.23
Indans _____ 0.73
Total aromatics _____ 10.21
Single-ring naphthenes _____ 26.15
Condensed-ring naphthenes _____ 8.73
Normal+isoparaffins _____ 54.90

Total _____ 100.00

Ratio: Fraction
Single-ring naphthenes/normal+isoparaffins __ .477
Condensed-ring naphthenes/normal+isoparaffins __ .159

Distribution of paraffins:
$C_5$ _____ 0.05
$C_6$ _____ 0.07
$C_7$ _____ 0.11
$C_8$ _____ 0.14
$C_9$ _____ 0.47
$C_{10}$ _____ 0.16

Total _____ 1.00

Distribution of naphthenes:
$C_5$ _____ 0.
$C_6$ _____ 0.03
$C_7$ _____ 0.20
$C_8$ _____ 0.29
$C_9$ _____ 0.33
$C_{10}$ _____ 0.15

Total _____ 1.00

It was vaporized, superheated to 700° F. and passed over the sieve beds at a rate of 1.6 w./w./hr. at 0 p.s.i.g. The effluent collected at the outlet and was analyzed. The following results, compiled in tabular form in Table II were observed.

TABLE II.—SEPARATION FACTORS

[Ratio: Naphthenes to total paraffins in sievate/naphthenes to total paraffins in feed]

| Sieve type | One-stage single-ring naphthenes | One-stage multiple-ring naphthenes | Four-stages (calculated) single-ring naphthenes |
|---|---|---|---|
| Li X | .754-.797 | .107-.170 | .333-.404 |
| Li Y | .818 | .27 | .450 |
| Ca X | .818-.840 | .301-.308 | .450-.498 |
| Mg X | .860-.881 | .201 | .547-.602 |
| Mg Y | .860 | .220 | .547 |
| Mn X | .860 | .214-.289 | .547 |
| Sr X | .860 | .264 | .547 |
| Sr Y | .845 | .258 | .510 |

The following conclusions with respect to the ability of the lithium exchanged sieves to adsorb one-ring naphthenes from a kerosene feedstream may be drawn from the above table. It is noted that the separation factors for single-ring naphthenes are further below 1.0 (no separation) for the lithium exchanged X and Y sieves than for the other types of sieves tested. The range of the separation factor for one-stage separation (which comes directly from the analysis of the feed and sievate) with the lithium exchanged sieves, .754 to .818, shows a much greater reduction from 1.0 than the other sieves most of which did not reduce the separation factor below .860. The separation factor for Li form of X sieve is partially good showing a single-ring naphthene to .754 to .797. The significance of this is more pronounced in a multi-stage operation. The lithium form of the sieves would reduce the ratio of single-ring naphthenes to total paraffins in the product effluent to .33 to .45 times that in the feed with four stages. In the case of Li exchanged form of X sieve, the reduction would be .33 to .40 times that of the feed with four stages. In contrast, most of the other sieves tested would not reduce the effluent to as low as .54 of that of the feed even with four stages.

It is also interesting to note that the lithium forms of the sieves had very good selectivity to multiple-ring naphthenes. The lithium form of X was outstanding with separation factors from .107 to .170. The average of the multiple-ring separation factors for the other sieves was only reduced to about .26 and the very best was reduced only to .201.

Example 2

A particular significant difference between lithium wide pore sieve and other exchanged sieves is seen in the preferred case.

The preferred case would include a step removing the previously adsorbed hydrocarbons with a displacing agent, i.e., ammonia. The subsequent adsorption then occurs with the sieve loaded with ammonia, which makes the selective adsorption of single-ring naphthenes more difficult. To test selectivity under these conditions, a sieve was loaded with ammonia prior to passing the feed over it. In this example, the calcium form of X sieve was selected for the test as it had shown selectivity which was second to the lithium form of wide pore sieve. After drying and cooling to 700° F., the calcium form of X sieve was saturated with ammonia by flow at 700° F. and 15 p.s.i.a. Then the feed used, as in Example 1, was passed over the sieve with the same conditions as used in Example 1. Under these more difficult conditions for adsorption with the calcium X sieve, there was no selectivity for single-ring naphthenes. The ratio of single-ring naphthenes to total paraffins in the sievate was the same as that in the feed. Thus, although several forms of molecular sieves can be used to achieve some selectivity for single-ring naphthenes by limiting the amount of aromatics of polar molecules passed over the bed in each adsorption, this selectivity can diappear when operating with preferred conditions including desorption with a displacing agent. Of course, selectivity could be obtained at the expense of adding an additional step for completely removing the displacing agent before the next adsorption.

Example 3

In Example 3, the lithium form of X sieve was used with ammonia displacement without ammonia removal before the subsequent adsorption. Not only was selectivity for single-ring naphthenes maintained but stable cyclic operation was obtained. The feed was the same jet fuel used in Example 1. It was passed in the vapor phase over the bed in adsorption at a rate of 2.7 w./w./hr. for 2 minutes at 690° F. and 15 p.s.i.a. Ammonia was used in desorption at a rate of 35 w./w./hr. for 1 minute at a pressure of 18 p.s.i.a. and temperature of 690° F. The composition of the sievate was: 28.5 wt. percent single-ring naphthenes; 3.0 wt. percent multiple-ring naphthenes; 67.8 wt. percent total paraffiins and .7 wt. percent aromatics.

The composition of the desorbate was: 27.5 wt. percent single-ring naphthenes; 12.0 wt. percent multiple-ring naphthenes; 46.8 wt. percent total paraffins and 13.7 wt. percent aromatics. The ratio of single-ring naphthenes to total paraffins in the sievate was .88 of that in the feed. There was an even greater difference compared to the desorbate. The ratio of single-ring naphthenes to total paraffns in the sievate was reduced to .715 of that in the desorbate. Another way of expressing the results is that the ratio of single-ring naphthenes to total paraffins was increased in the desorbate by a factor of 1.4 over that in the sievate by a single stage of separation.

This shows effective separation using lithium X sieve with the preferred ammonia displacement in stable cyclic operation without resorting to an expensive intermediate step to remove $NH_3$ before adsorption.

Although this invention has been described with some degree of particularity, it is intended only to be limited by the attached claims.

What is claimed is:
1. A process for separating one-ring naphthenes from mixtures of said naphthenes and at least one constituent from the group consisting of aromatics, multiple-ring naphthenes, normal paraffins and isoparaffins, which comprises contacting said mixture with a lithium type molecular sieve, said molecular sieve having pore openings of about 6.5 to 15 Angstroms in an adsorption zone whereby the said one-ring naphthenes are selectively adsorbed.
2. The process of claim 1 wherein said mixture is a kerosene.
3. The process of claim 1 wherein said mixture is a lube oil.
4. A process for separating one-ring naphthenes from mixtures of said naphthenes and aromatics and at least one constituent selected from the group consisting of multiple-ring naphthenes, normal paraffins and isoparaffins which comprises contacting said mixture with a lithium type molecular sieve, said molecular sieve having Angstrom openings of 8 to 11 Angstroms in an adsorption zone, and limiting the quantity of aromatics and hydrocarbons with polar groups to less than 0.1 w./w. per cycle, whereby the said one-ring naphthenes are adsorbed, collecting an effluent stream which is depleted in one-ring naphthenes, desorbing the adsorbed components from said molecular sieve and thereby recovering a stream having increased content of one-ring naphthenes relative to said mixture prior to said contacting.
5. The process of claim 4 wherein said one-ring naphthene is cyclohexane.
6. The process of claim 4 wherein said mixture is a jet fuel.
7. The process of claim 4 wherein said mixture is a lubricating oil.
8. A process for separating one-ring naphthenes from mixtures of said naphthenes and aromatics and at least one constituent selected from the group consisting of multiple-ring naphthenes, normal paraffins and isoparaffins which comprises contacting said mixture with a lithium type molecular sieve, said molecular sieve having Angstrom openings of 8 to 11 Angstroms in an adsorption zone whereby at least a portion of the one-ring naphthenes are adsorbed onto said molecular sieve, desorbing said adsorbed constituents with a displacing agent and passing said mixture of said sieve whereby the displacing agent is substantially desorbed from said sieve.
9. The process of claim 8 wherein said displacing agent is ammonia.
10. The process of claim 9 wherein said mixture is a jet fuel.

References Cited

UNITED STATES PATENTS 3,242,070   3/1966   Epperly et al. _____ 208—310
3,372,108   3/1968   Epperly et al. _____ 208—310

HERBERT LEVINE, *Primary Examiner.*

U.S. Cl. X.R.
260—660, 674